United States Patent
Oyasato et al.

(10) Patent No.: US 7,138,435 B2
(45) Date of Patent: Nov. 21, 2006

(54) METHOD OF DECOMPOSING THERMOSETTING RESIN, APPARATUS AND HEAT CONTROL PROGRAM

(75) Inventors: Yumiko Oyasato, Kanagawa-ken (JP); Cao Minh Thai, Kanagawa-ken (JP); Shioko Saya, Kanagawa-ken (JP); Shinetsu Fujieda, Kanagawa-ken (JP); Tomiaki Furuya, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 467 days.

(21) Appl. No.: 09/964,581

(22) Filed: Sep. 28, 2001

(65) Prior Publication Data

US 2002/0170474 A1    Nov. 21, 2002

(30) Foreign Application Priority Data

Sep. 28, 2000  (JP) .............................. 2000-296354

(51) Int. Cl.
*C08J 11/04* (2006.01)
(52) U.S. Cl. ...................... 521/49; 521/48; 521/48.5; 521/49.5
(58) Field of Classification Search ............... 521/49, 521/49.5, 48, 48.5
See application file for complete search history.

(56) References Cited

U.S. PATENT DOCUMENTS 5,578,649 A    11/1996   Imai et al.

FOREIGN PATENT DOCUMENTS

JP        11323009 A    *  11/1999

\* cited by examiner

*Primary Examiner*—Tae H. Yoon
(74) *Attorney, Agent, or Firm*—Oblon, Spivak, McClelland, Maier & Neustadt, P.C.

(57) ABSTRACT

A method of decomposing a thermosetting resin by a decomposer comprising the steps of: pre-heating the thermosetting resin up to a pre-heating temperature T0; kneading the pre-heated thermosetting resin together with a decomposer, and concurrently heating a mixture comprising the thermosetting resin and the decomposer up to a kneading temperature T1, thereby allowing a reaction to take place between the decomposer and the thermosetting resin to obtain a kneaded matter wherein the decomposer becomes consumed; and heating the kneaded matter to a maximum temperature T2 to thereby decompose the thermosetting resin; wherein the preheating temperature T0 is not higher than the boiling temperature of the decomposer; the kneading temperature T1 is not lower than the pre-heating temperature T0 but is lower than the thermal decomposition temperature of the thermosetting resin; the maximum temperature T2 is lower than the decomposition temperature of the thermosetting resin; and the pre-heating of the thermosetting resin is performed under the following conditions of temperature T0 and time t:

$100°\ C. \leq T0 < 260°\ C.$ $0.5\ \min \leq t \leq 7\ \min.$

17 Claims, 4 Drawing Sheets

METHOD OF DECOMPOSING THERMOSETTING RESIN, APPARATUS AND HEAT CONTROL PROGRAM

BACKGROUND OF THE INVENTION

1. Field of the Invention

This invention relates to a method of decomposing a thermosetting resin, and to an apparatus and a heat control program for carrying out the method.

2. Description of the Background

Discarded electric household appliances provide one example of waste matters comprising a thermosetting resin. In recent years, it has been increasingly requested to recycle discarded electric household appliances. With a view to responding to such requests, it is now extensively studied to discover methods of recycling discarded electric household appliances by examining each of their components. In the disposal of discarded refrigerators, for example, since foamed urethane resin is employed therein as a heat-insulating material, the recycle of the urethane resin is studied now.

As for the method of recycling foamed urethane resin, there have been proposed various methods in the past. For example, Japanese Patent Unexamined Publication H6-184513 sets forth a method wherein a thermosetting resin comprising soft or hard polyurethane foam is decomposed at a constant temperature ranging from 150 to 280° C. using aminoethanol as a decomposer.

However, this method is problematical in that it takes a lot of time for decomposing the polyurethane foam, e.g., 11 hours at a temperature of 190° C., 2 hours even at a higher temperature of 230° C., and that under some circumstances, it is impossible to completely decompose the thermosetting resin. The reason for this may be attributed to the fact that the decomposer is not necessarily fully effective. Specifically, when the thermal decomposition of the thermosetting resin is immediately started at this range of temperatures, the heating is initiated at a temperature which is higher than the boiling point of the decomposer, such as aminoethanol. As a result, the decomposer is forced to volatilize before it is sufficiently mixed with the thermosetting resin, thus making it impossible to perform the kneading of the decomposer with the thermosetting resin at a constant mixing ratio, thereby inviting a phenomenon where the decomposing reaction of the thermosetting resins is inhibited.

This invention has been accomplished under the circumstances as mentioned above, and therefore, an object of this invention is to provide a method of decomposing thermosetting resins, which makes it possible to shorten the time required to decompose thermosetting resins, and to completely decompose thermosetting resins.

Another object of this invention is to provide an apparatus for decomposing thermosetting resins using the aforementioned method.

A further object of this invention is to provide a control program for the method of decomposing thermosetting resins.

SUMMARY OF THE INVENTION

According to this invention, there is provided a method of decomposing a thermosetting resin by a decomposer, comprising the steps of:

pre-heating the thermosetting resin up to a pre-heating temperature T0;

kneading the pre-heated thermosetting resin together with a decomposer, and concurrently heating a mixture comprising the thermosetting resin and the decomposer up to a kneading temperature T1, thereby allowing a reaction to take place between the decomposer and the thermosetting resin to obtain a kneaded matter wherein the decomposer becomes consumed; and heating said kneaded matter to a maximum temperature T2 to decompose the thermosetting resin; wherein:

said pre-heating temperature T0 is not higher than the boiling temperature of said decomposer;

said kneading temperature T1 is not lower than said pre-heating temperature T0 but is lower than the thermal decomposition temperature of the thermosetting resin;

said maximum temperature T2 is lower than the decomposition temperature of the thermosetting resin; and said pre-heating of the thermosetting resin is performed under the following conditions of temperature T0 and time t:

$$100° C. \leq T0 < 260° C.$$

$$0.5 \text{ min} \leq t \leq 7 \text{ min}.$$

According to this invention, there is also provided a decomposition apparatus for decomposing a thermosetting resin by the aforementioned method, wherein said apparatus comprises:

a chamber for accommodating the thermosetting resin;

a temperature controllable heating means for heating said chamber;

a decomposer supply means for feeding a decomposer to said chamber;

a monitoring means for detecting a quantity of residual decomposer left in said chamber; and a temperature control means for controlling said heater on the basis of the quantity of residual decomposer.

According to this invention, there is also provided a control program for controlling heating of a thermosetting resin in a decomposition process of said thermosetting resin, wherein said program comprises the steps of:

instructing a computer to heat a chamber accommodating the thermosetting resin up to a temperature T0;

instructing the computer to determine if said temperature T0 of said chamber is in the range of 100 to 260° C., and if heating time is in the range of 0.5 min to 7 min;

instructing the computer, when it is determined that said temperature T0 of said chamber is in the range of 100 to 260° C., and said heating time is in the range of 0.5 min to 7 min, to feed a decomposer to said chamber for a decomposition of the thermosetting resin;

instructing the computer to heat said chamber at a temperature of less than the thermal decomposition temperature of the thermosetting resin;

instructing the computer to detect the quantity of residual decomposer left in said chamber;

instructing the computer to determine if the quantity of residual decomposer is less than 10%;

instructing the computer, when it is determined that the quantity of residual decomposer is not less than 10%, to continue heating of said chamber while keeping the temperature of the thermosetting resin to less than the decomposition temperature of the thermosetting resin; and instructing the computer, when it is determined that the quantity of residual decomposer is less than 10%, to raise a maximum temperature from a temperature T1 at this moment up to T2 which is higher than T1.

BRIEF DESCRIPTION OF THE DRAWINGS

The invention can be more fully understood from the following detailed description when taken in conjunction with the accompanying drawings, in which.

DETAILED DESCRIPTION OF THE INVENTION

It has been found as a result of intensive studies made by the present inventors that the chemical decomposition of a thermosetting resin by a decomposer can be more effectively carried out when the thermosetting resin is preheated prior to the addition of the decomposer to the thermosetting resin, thereby accomplishing the present invention. In the method of decomposing a thermosetting resin according to this invention, the thermosetting resin is at first preheated up to a pre-heating temperature $T0$. As a result of this preheating, the temperature of the thermosetting resin itself is raised to promote the fluidity of the thermosetting resin.

Then, a decomposer is added to the thermosetting resin, the resultant mixture being subsequently kneaded. In this case, under some circumstances, the kneading may be performed by raising the temperature of the mixture, thereby allowing the decomposer to be almost completely consumed. During this kneading step, the decomposer is attached to a carbonyl bond in the thermosetting resin, thereby forming an intermediate product. The treatment temperature of the thermosetting resin is further raised even after the generation of this intermediate product for performing the decomposition of the thermosetting resin.

Namely, the thermosetting resin is preheated in the preheating step so as to facilitate the kneading thereof with a decomposer to be subsequently added thereto. Generally, the decomposer is added to the thermosetting resin at an initial stage of the kneading step. Incidentally, when a decomposer is added to the thermosetting resin of room temperature as seen in the conventional method, it is difficult to effectively perform the kneading of thermosetting resin with the decomposer, thereby necessitating a lot of time for accomplishing the decomposition of the thermosetting resin. By contrast, according to this invention, since the thermosetting resin is preheated prior to the kneading, the kneading of thermosetting resin with a decomposer can be effectively performed.

Specifically, the preheating temperature $T0$, the kneading temperature $T1$ and a maximum temperature $T2$ according to this invention can be set in the following manner.

Figure 1:
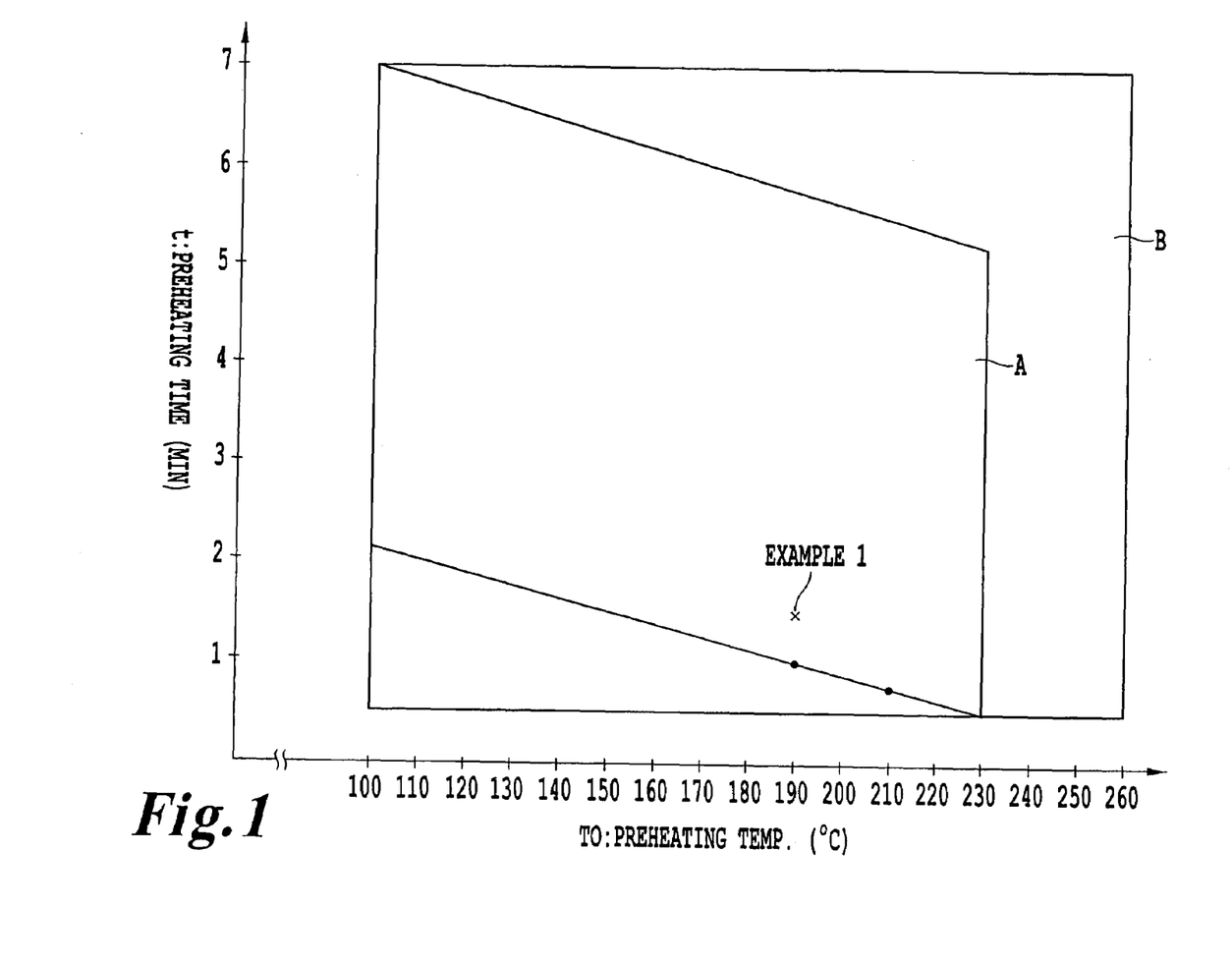
FIG. 1 is a graph illustrating the conditions with respect to the temperature and time in the pre-heating step according to one embodiment of this invention.

The preheating temperature $T0$ should be not higher than the boiling temperature of a decomposer. Further, if the preheating temperature $T0$ in the preheating step is represented on the x-axis, and the preheating time t is represented an the y-axis, the conditions for the preheating step can be set so as to satisfy the following conditions of temperature $T0$ and time t:

$$100° C. \leq T0 < 260° C.$$

$$0.5 \text{ min} \leq t \leq 7 \text{ min}.$$

Namely, the preheating should be performed under the conditions which fall within the region defined by B in the graph of FIG. 1. Specifically, the preheating should be performed by controlling the temperature and time thereof so as to make them fall within the aforementioned region.

If the preheating time is less than 0.5 min, it would become difficult to sufficiently preheat the thermosetting resin. On the other hand, if the preheating time exceeds 7 min, the resin may be hardened.

More preferably, the preheating step should be performed under the following conditions of temperature $T0$ and time t:

$$100° C. \leq T0 < 230° C.$$

$$0.5 \text{ min} \leq t \leq 7 \text{ min}$$

$$3.375 \leq 0.0125 T0 + t \leq 8.25$$

Namely, according to the method of this invention, the preheating should preferably be performed under the conditions which fall within the region defined by A in the graph of FIG. 1.

A decomposer which is capable of decomposing the thermosetting resin is added to this preheated thermosetting resin. Further, the kneading of the thermosetting resin together with the decomposer is performed by raising the temperature of the thermosetting resin up to the aforementioned temperature $T0$ or more. Preferably, the temperature in the kneading step should be not higher than the boiling point of the decomposer and also not higher than the decomposition temperature of the thermosetting resin. In the case where plural kinds of decomposers are concurrently employed, the temperature $T1$ should preferably be set such that it is lower than the boiling point of any of these decomposers. If the temperature $T1$ is higher than the boiling point of any of these decomposers, any one of these decomposers may be volatilized before it is fully kneaded, so that it would become impossible to perform the kneading of the thermosetting resin with the decomposers at a constant mixing ratio. As a result, the decomposition reaction of the thermosetting resin would become insufficient.

As described above, the temperature $T1$ should preferably be not higher than the decomposition temperature of the thermosetting resin. If the temperature $T1$ is higher than the decomposition temperature of the thermosetting resin, the thermal decomposition reaction of the thermosetting resin itself would be initiated before the kneading between the thermosetting resin and the decomposer would take place substantially, resulting in the generation of hydrocarbon gas and hence obstructing the decomposition reaction of the thermosetting resin.

When thermosetting resins are heated under excessively high temperatures, the thermal decomposition of thermosetting resins is initiated, generating hydrocarbon gas. For this reason, the kneading temperature $T1$ should preferably be set to not higher than 200° C. On the other hand, the lower limit of the kneading temperature $T1$ should preferably be set to not lower than 100° C. When the kneading temperature $T1$ is set to lower than 100° C., flon or halogen of halogenated hydrocarbon which are included in a foamed thermosetting resin may be preferentially reacted with the urethane bond of the thermosetting resin, thereby obstructing the decomposition of the thermosetting resin. Therefore, it is preferable for the purpose of avoiding these undesirable phenomena to eliminate these gases during the kneading step to be performed at a temperature of T1.

The temperature during the kneading step may be kept substantially constant, and the final temperature T1 thereof may be substantially identical with the preheating temperature T0. When the temperature during the kneading step and the final temperature T1 are selected to be identical with the preheating temperature T0±15° C., the final temperature T1 may be assumed as being substantially identical with the preheating temperature T0.

When the thermosetting resin is allowed to react with the decomposer under these conditions, the decomposer is consumed.

According to this invention, the kneading should preferably be performed while monitoring the quantity of residual decomposer. Further, the quantity of residual decomposer after finishing the kneading step should preferably be less than 10%. If the quantity of residual decomposer after finishing the kneading step is more than 10%, it would become difficult to sufficiently decompose the thermosetting resin in the subsequent decomposition step to be performed successively. The temperature at the time when the quantity of residual decomposer becomes less than 10% may be defined as the final temperature T1 of the kneading step.

After the temperature of kneaded matter has reached the final temperature T1, the temperature of kneaded matter is further raised up to the maximum temperature T2 to initiate the decomposition reaction of the thermosetting resin.

Therefore, it is preferable in this invention to control the heating on the basis of the quantity of residual decomposer on the occasion of raising the temperature from T1 to the maximum temperature T2. The maximum temperature T2 on this occasion is set higher than the final temperature T1 of the kneading step. However, this maximum temperature T2 should preferably be controlled to not higher than the thermal decomposition temperature of the decomposed products to be generated on this occasion. Incidentally, the maximum temperature T2 may be higher than the boiling point of the decomposer. This will be explained hereinafter with reference to the following examples.

The following reaction formulas (1a) and (1b) illustrate the reactions in the kneading step and in the decomposition step, which will take place on the occasion of decomposing urethane resin as one example of thermosetting resin by alkanol amine as a decomposer according to this invention.

A: Material to be decomposed (Urethane resin)

U: Urethane bond

B: Decomposer (alkanol amine)

C: Intermediate product

C: Intermediate product

D: Decomposed matters       (1b)

wherein $R^1$ and $R^2$ are respectively each a bivalent organic group, preferably alkyl group or aryl group;

$R^3$, $R^4$, $R^6$ and $R^7$ are respectively each a hydrogen atom or a monovalent organic group, preferably $—CH_2CH_2OH$;

$R^5$ is bivalent organic group, preferably an alkylene group; and n and m are respectively a positive integer.

When urethane resin is to be decomposed by alkanol amine, the carbon atom of carbonyl group of the urethane bond in the urethane resin A is attacked by the nitrogen atom of alkanol amine B employed as a decomposer during the kneading step, thereby enabling the alkanol amine B to be attached to the urethane resin A, thus producing an intermediate product C as shown in the reaction formula (1a).

In the following decomposition step, when this intermediate product C is heated up to the maximum temperature T2, the intermediate product C is decomposed as shown in the reaction formula (1b) to produce decomposition products D. As seen from these reaction formulas, the intermediate product C to be produced through the bonding of alkanol amine as a decomposer to urethane resin is constituted by a compound which differs from the original alkanol amine added as a decomposer B. Therefore, the maximum temperature T2 in the subsequent step, i.e., the decomposition step may be higher than the boiling point of the alkanol amine B employed as a decomposer.

The reaction formulas on the occasion of decomposing urethane resin by monoethanol amine ($NH_2CH_2CH_2OH$), diethanol amine ($HOCH_2CH_2NHCH_2CH_2OH$) or triethanol amine ($N(C_2H_4OH)_3$) as a decomposer according to this invention are shown below.

Monoethanol amine

Diethanol amine

Triethanol amine

As shown in the above reaction formulas, an intermediate product comprising urethane resin to which a decomposer is attached can be produced in the kneading step in every case.

Next, examples where compounds each having hydroxyl group are employed as a decomposer will be explained.

The following reaction formulas (2a) and (2b) illustrate the reactions in the kneading step and in the decomposition step, which will take place on the occasion of decomposing urethane resin by polyol as a decomposer according to this invention.

A: Material to be decomposed

F: Intermediate product

-continued

F: Intermediate product

G: Decomposed matters (2b)

wherein $R^1$ and $R^2$ are respectively each a bivalent organic group, preferably an alkyl group or aryl group;

$R^8$ and $R^9$ are respectively each a bivalent alkyl group; and n and m are respectively a positive integer excluding 0.

When urethane resin is to be decomposed by polyol, the oxygen atom of the hydroxyl group of the compound E having hydroxyl groups and employed as a decomposer is attached to the carbon atom of a carbonyl group of the urethane bond in the urethane resin A during the kneading step, thus producing an intermediate product F as shown in the reaction formula (2a).

In the following decomposition step, when this intermediate product F is heated up to the maximum temperature $T2$, the intermediate product F is decomposed as shown in the reaction formula (2b) to produce decomposition products G. As seen from these reaction formulas, the intermediate product F to be produced through the bonding of a compound having hydroxyl group to urethane resin is constituted by a compound which differs from the original compound E having hydroxyl group and employed as a decomposer. Therefore, the maximum temperature $T2$ in the subsequent step, i.e., the decomposition step may be higher than the boiling point of the compound having hydroxyl group and employed as a decomposer.

The maximum temperature $T2$ in the decomposition step should be $T2>T1$. Further, it is much desired in order to shorten the time required for the decomposition of thermosetting resin that the maximum temperature $T2$ be not lower than the boiling point of the decomposer. Further, it is also preferable that the difference in temperature between the maximum temperature $T2$ in the decomposition step and the final temperature $T1$ in the kneading step be 20° C. or more.

On the other hand, the upper limit of the maximum temperature $T2$ should preferably be not higher than 300° C. If the upper limit of the maximum temperature $T2$ exceeds 300° C., a thermal decomposition reaction which is separate from the chemical decomposition reaction of thermosetting resin by the decomposer may be initiated to take place. As a result, hydrocarbon gas or a harmful gas such as dioxin may be generated.

As explained above, the method of decomposing thermosetting resins according to this invention comprises a preheating step, a kneading step and a decomposition step, each step being carried out at a predetermined temperature. These three steps can be performed within a single apparatus such as a kneader or a reactor, wherein the temperature is allowed to rise from the preheating temperature $T0$ to the maximum temperature $T2$. The employment of a single apparatus is advantageous since the temperature can be controlled while observing the state of decomposed matters discharged from the outlet port of the apparatus.

Alternatively, three unit apparatuses which are connected sequentially may be employed. In this case, a first unit apparatus can be employed for preheating a thermosetting resin up to the temperature $T0$, a second unit apparatus can be employed for kneading the thermosetting resin at the final temperature $T1$ after incorporating a decomposer into the thermosetting resin, and a third unit apparatus can be employed for decomposing the thermosetting resin by heating the thermosetting resin up to the maximum temperature $T2$. When a plurality of unit apparatuses are employed in this manner, the elimination of flon can be concurrently performed in the second unit apparatus.

Thermosetting Resins:

As for the thermosetting resin which can be decomposed according to this invention, preferable examples thereof include a resin having carbonyl groups, such as a resin having urethane bonds, a resin having urea bonds and unsaturated polyester, the most preferable example thereof being urethane resin. As for the urethane resin, it is possible to employ any kind of urethane resin containing urethane bonds, urea bonds, etc. Specific examples of urethane resins are soft urethane, hard urethane, semi-hard urethane, urethane elastomer and urethane rubber.

As for the examples of other kind of thermosetting resin to be decomposed, they include acid anhydride-cured epoxy resin, amine-cured epoxy resin, phenol-cured epoxy resin, urea resin, melamine resin, phenol resin, alkyd resin, polyimide resin, unsaturated polyester resin and cross-linked polyethylene.

Any of these thermosetting resins should preferably be pulverized before they are subjected to the preheating step. The following reaction formula (3) illustrates the reaction involved in the step of kneading acid anhydride-cured epoxy resin or unsaturated polyester together with alkanol amine employed as a decomposer. On the other hand, the following reaction formula (4) illustrates the reaction involved in the step of kneading urea resin together with alkanol amine.

-continued (4)

Intermediate product wherein $R^3$, $R^4$, $R^6$ and $R^7$ are respectively each a hydrogen atom or a monovalent organic group, preferably —$CH_2CH_2OH$;

$R^5$ is a bivalent organic group, preferably an alkyl group;

$R^1$, $R^2$, $R^{10}$ and $R^{11}$ are respectively each a bivalent organic group, preferably an alkylene group or bivalent phenyl group; and n and m are respectively a positive integer.

Even if the kind of thermosetting resin is altered, when the altered thermosetting resin is subjected to the decomposition process according to the method of this invention, an intermediate product can be generated in the step of the kneading thereof together with a decomposer.

Decomposer:

The decomposer is employed for assisting the decomposition of thermosetting resins to be decomposed. As for the specific examples of the decomposer, they include a single amine compound, a single compound having hydroxyl group, and a combination of amine compound with a compound having hydroxyl group.

As for the amine compound, linear aliphatic amines, cyclic aliphatic amines, aromatic amines and heterocyclic amines can be used. Specific examples of linear aliphatic amines include ethylene diamine, tetramethylene diamine, hexamethylene diamine, 2-ethylhexyl amine, monoethanol amine, diethanol amine, triethanol amine, iso-propanol amine, n-propyl amine, di-n-propyl amine, n-amyl amine, iso-butyl amine and methyldiethyl amine. Specific examples of cyclic aliphatic amines include cyclohexyl amine, piperazine and piperidine. Specific examples of aromatic amines include aniline, toluidine, xylilene diamine, benzyl amine and chloroaniline. Specific examples of heterocyclic amines include pyridine, picoline, N-methyl morpholine, ethyl morpholine, and pyrazole. These amines can be employed singly or in any combination of two or more.

As for the compounds having a hydroxyl group, specific examples thereof include dihydric alcohols such as ethylene glycol, diethylene glycol, propylene glycol, trimethylene glycol, 1,4-butane diol, 1,5-pentane diol, 1,6-hexane diol, polyoxyethylene glycol and polyoxypropylene glycol; trihydric alcohols such as glycerin; and polymers such as polyethylene glycol.

The mixing ratio of the aforementioned decomposers to the thermosetting resins may be of nonstoichiometric composition. More specifically, the mixing ratio of the thermosetting resins to the decomposers (thermosetting resin:decomposer) should preferably be in the range of 1:3 to 1:20 (based on weight). If the relative amount of the decomposers is too small, it would become difficult to sufficiently decompose the thermosetting resins. On the other hand, if the relative amount of the decomposers is too large, a lot of gas may be caused to generate due to the volatilization of the decomposers in the vicinity of the outlet port of apparatus. More preferably, the mixing ratio of the thermosetting resins to the decomposers (thermosetting resin:decomposer) should be confined within the range of 1:5 to 1:7 (based on weight).

Figure 2:
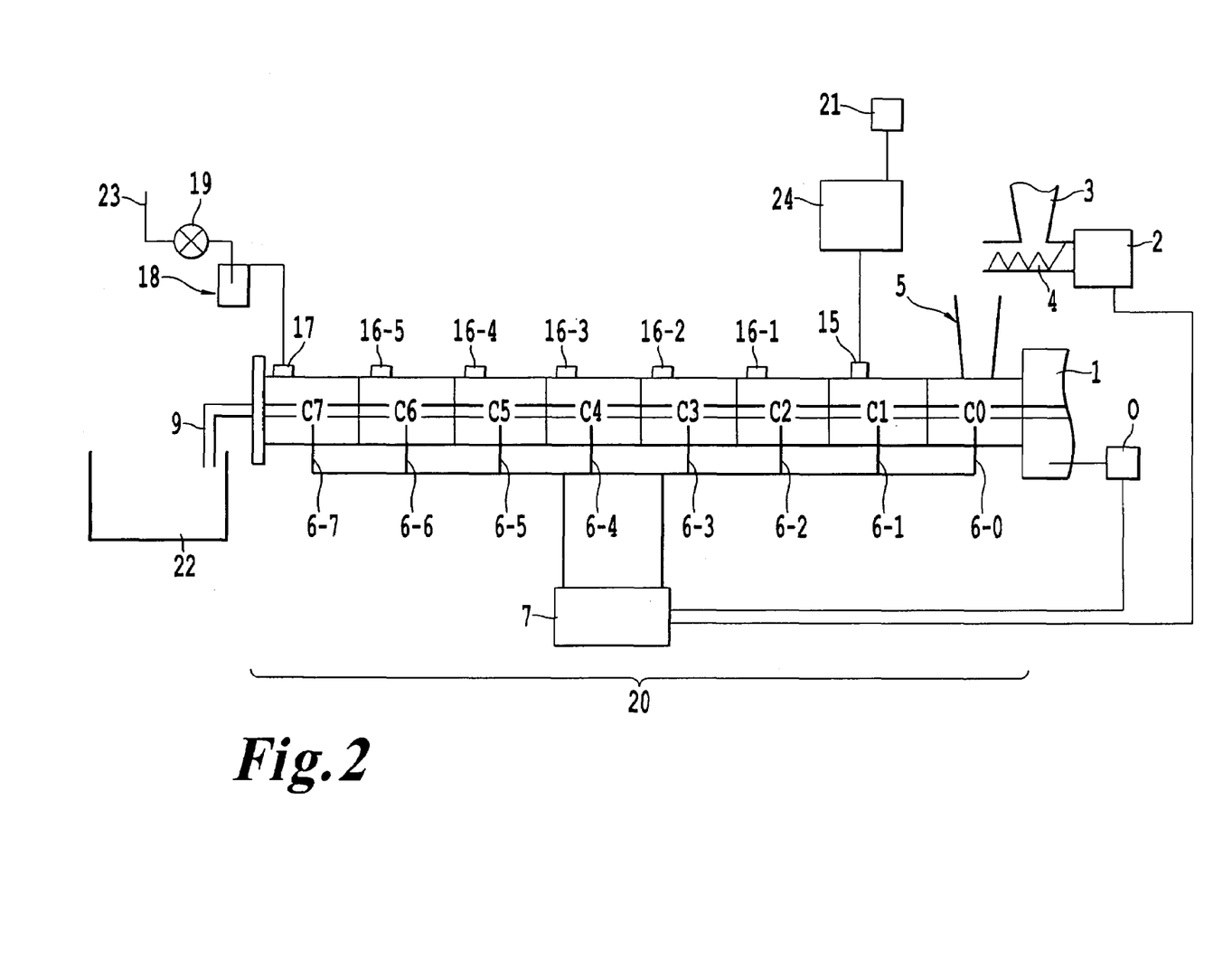
FIG. 2 is a schematic view illustrating the extruder according to one embodiment of this invention.

Decomposition Apparatus:

FIG. 2 shows a decomposition apparatus according to one embodiment of this invention. The following is an explanation on this decomposition apparatus.

A thermosetting resin to be decomposed is placed in a hopper 3 and then, pulverized by a screw 4. Incidentally, the screw 4 is driven by a motor 2, which is controlled by a control board 7.

A reaction vessel 20 for preheating, kneading and decomposing the thermosetting resin is partitioned into eight chambers (barrels) C0 to C7. These barrels are provided with heat control means 6-0 to 6-7, respectively, so as to make it possible to set any desired temperature. Each of the heat control means in this case may be constituted for example by a heater, a thermocouple, a cooling water supply tube, etc.

The thermosetting resin pulverized is fed via an inlet port 5 to a first barrel C0. The inner temperature of the first barrel is set to a preheating temperature T0 by the heat control means 6-0. Preheating of the thermosetting resin is performed in this barrel C0 in this manner, i.e., this barrel C0 is assigned for the preheating step.

Figures 3, 5:
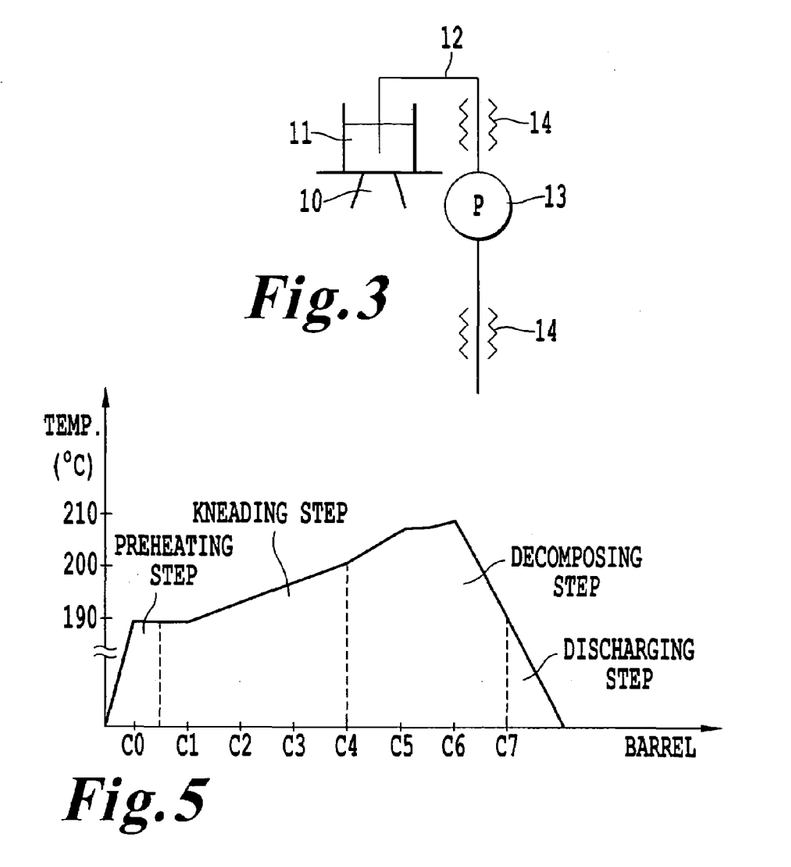
FIG. 3 is a diagram schematically illustrating the construction of the decomposer supply means in the extruder shown in FIG. 2.
FIG. 5 is a graph illustrating the temperature history during the reaction in Example 1 of this invention.

Upon finishing the preheating, the thermosetting resin is transferred to a second barrel C1. This second barrel C1 is designed such that a decomposer can be injected thereinto through a decomposer injection port 15 by a decomposer supply means 24. This decomposer supply means 24 is controlled by a controller 21, and comprises as shown in FIG. 3 a weighing instrument 10, a tank 11 for storing the decomposer, a piping 12, an injection pump 13 and a heater 14 for heating the piping 12.

In the barrel C1, the kneading of the thermosetting resin and the decomposer is initiated. This kneading step can be performed in any of the barrels disposed on the downstream side of the barrel C1. The final temperature T1 in this kneading step should be not lower than the aforementioned preheating temperature T0 but lower than the decomposition temperature of the thermosetting resin. As already explained above, during this kneading step, the decomposer is consumed through the reaction between the thermosetting resin and the decomposer.

The monitoring of quantity of residual decomposer during this kneading step can be performed in such a manner that a GC (gas chromatography, a GC/MS (gas chromatography-mass spectrometer), etc. are attached to predetermined barrel portions, and data on the residual quantity of decomposer is fed back to the control board 7. This control board 7 is enabled to control, on the basis of the residual quantity of decomposer, the temperature of barrels of later stage so as to raise it higher.

The resin mixture and decomposed matters existing inside the reaction vessel 20 are pushed out by the screw 1 toward a discharge nozzle 9. Since this screw is extended along the length of the reaction vessel 20, the contents placed in the reaction vessel 20 are enabled to be pushed up to the discharge nozzle 9.

Namely, the mixture that has been kneaded inside the barrel CI is successively pushed out passing through the barrels disposed on the downstream side of the barrel C2.

As shown in FIG. 2, the barrels C2 to C7 are provided with vents 16-1 to 16-5 and 17, respectively. The last vent 17 of the final barrel C7 is connected with a condenser 18 and with a vacuum pump 19. This vacuum pump 19 is connected with an exhaust system 23 so as to make it possible to discharge flon gas, hydrocarbon gas, etc. that have been generated through the reactions in these barrels or generated from urethane resin. The decomposed matters are discharged from the nozzle 9 of the final barrel C7 and placed in a receiving vessel 22.

The heat control means 6-0 to 6-7 for controlling the temperature of the barrels C0 to C7 are designed to be controlled by the temperature controlling means (control board) 7. Specifically, the barrel C0 which is assigned to perform the preheating step is heated up to an inner temperature T0 which is not more than the boiling point of the decomposer. Further, any desired barrel which is assigned to perform the kneading step is heated up to an inner temperature T0 which is not more than the thermal decomposition temperature of thermosetting resin, and the temperature of the final barrel is set to the final temperature T1. Additionally, a barrel which is assigned to perform the decomposition step subsequent to the kneading step is set such that the maximum temperature becomes T2 which is higher than the aforementioned final temperature T1.

As for the reactor, it is possible to employ an extruder which is capable of heating and extruding a thermosetting resin while enabling the thermosetting resin to be kneaded together with a decomposer. The temperatures of the extruder along the length thereof extending from the inlet port 5 to the discharge nozzle 9 are increased from T0 to T2 as described above. In this case, the extruder may be uniaxial or biaxial. Further, it is also possible to employ any desired kinds of device such as a continuous kneader or a monopump as long as they are capable of performing the heating and kneading of thermosetting resin. Since these kneaders are capable of performing a continuous decomposition reaction, they are suited for the decomposition of a large quantity of thermosetting resin.

The decomposition method of thermosetting resin according to this invention is performed while controlling the temperature of thermosetting resin under specific conditions.

Figure 4:
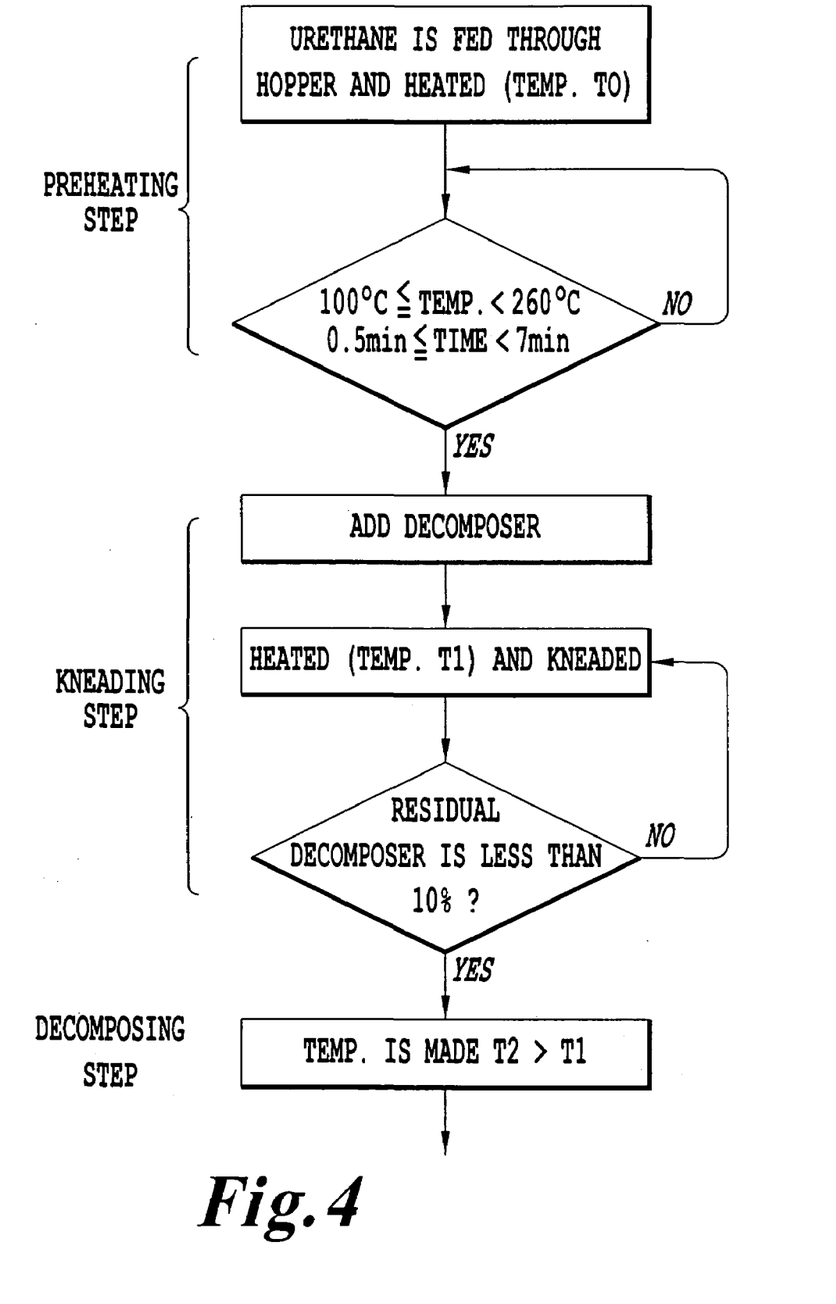
FIG. 4 is a flow chart of the program for controlling the temperature in the decomposition process of thermosetting resin according to this invention.

FIG. 4 is a flow chart illustrating the flow of program for the control of temperature.

As shown in FIG. 4, urethane is introduced into the hopper for preheating the urethane at a temperature T0. On this occasion, it is determined whether or not the temperature T0 and the time are those falling within predetermined ranges. If it is determined that these conditions are not met, the preheating is continued until these conditions are met.

Subsequently, a decomposer is added to the thermosetting resin, and the kneading step is initiated. During this kneading step, the quantity of residual decomposer is monitored. The kneading is continued until the quantity of residual decomposer is reduced to less than 20%. When the quantity of residual decomposer is reduced to less than 10%, the temperature of the resin is further raised up to the maximum temperature T2 to thereby allow the thermosetting resin to decompose.

As already explained above, by the apparatus shown in FIG. 2, the preheating step is performed in the first barrel C0. In order to perform the control of temperature in this manner in the apparatus shown in FIG. 2, the data on the temperature inside the barrel C1 as well as on the time are fed back to the control board 7. Additionally, the quantity of residual decomposer in any of barrels disposed on the downstream side of the barrel C1 where the kneading step can be performed is fed back to the control board 7. Thus, the control board 7 is operated, based on the data thus obtained, to control the temperatures of the entire barrels.

Having generally described this invention, a further understanding can be obtained by reference to certain specific examples and comparative examples which are provided herein for purposes of illustration only and are not intended to be limiting unless otherwise specified.

Decomposition of Urethane:

EXAMPLE 1

In this example, urethane resin employed as a heat insulating member in a used refrigerator and an amine compound as a decomposer were kneaded and heated in a double-screw extruder shown in FIG. 2 to perform the decomposition of the urethane resin.

First of all, the inner temperature of the barrel C0 constituting a chamber of the extruder was set to 170° C. Then, urethane resin was introduced into the barrel C0 at a rate of 1.6 kg/hour, and preheated for one minute.

The urethane resin thus preheated was transferred to the barrel C1 whose inner temperature was set to 190° C. Diethanol amine (DEA) as a decomposer was introduced into the decomposer injection port 15 at a rate of 0.32 kg/h by the decomposer supply means 24. The boiling point of the DEA employed in this example was 180° C. Further, the mixing ratio of the urethane resin to the decomposer (resin:decomposer) was set to 5:1.

The temperatures of each of the barrels C1 to C7 were set as shown in FIG. 5. As seen from FIG. 5, the temperatures of barrels C1 to C3 assigned to the kneading step were set so as to gradually raise the temperature, i.e., 190° C. inside the barrel C1, 194° C. inside the barrel C2, and 198° C. inside the barrel C3. The preheating step was performed in the barrel C0 where the raw materials were introduced at first. As a result, 90% of the DEA or decomposer was consumed in the barrel C1.

It was found through various experiments that the kneading step should preferably be performed such that at least 90% of decomposer was consumed in a temperature region which was maintained to not higher than the boiling point of the decomposer.

The decomposed matters were allowed to transfer, after passing through the decomposition step and discharging step, from the discharge nozzle 9 to the receiving vessel 22. Incidentally, on this occasion of taking up the decomposed matters from the kneader, the foaming agent in the resin was also eliminated by a pump.

When the conditions of the decomposed matters thus obtained was investigated, the decomposed matters were composed of a yellow transparent viscous liquid containing no solid matter after kneading for four minutes and 45 seconds, thus demonstrating that the urethane could be completely decomposed.

Additionally, the state of the decomposed matters was evaluated according to the following procedures. Namely, the viscous liquid discharged from the discharge nozzle was taken up on a vat, and scooped up using a knife. The viscous liquid thus taken up was extended over a white cloth. A region of this extended layer about 10 cm×10 cm in size was visually observed to find out the grain of urethane, and the state of viscous liquid was evaluated according to three stages as illustrated below.

○: The grain of urethane could not be observed at all on the surface of the white cloth.

Δ: The grain of urethane was observed on the surface of the white cloth.

X: The grain of urethane was observed clearly and in large amounts on the surface of the white cloth.

As a result of this visual evaluation, the decomposed matters obtained in this Example 1 was found to belong to the class ○.

COMPARATIVE EXAMPLE 1

An experiment was performed using the same apparatus as employed in Example 1 and under the same conditions as in Example 1 except that the inner temperature of the barrel C0 was set to 190° C., and the temperatures of the barrels C1 to C7 were kept at a constant temperature of 190° C.

As a result, the existence of undecomposed urethane resin powder was visually recognized at the discharge nozzle. The evaluation in this case was Δ.

COMPARATIVE EXAMPLE 2

An experiment was performed using the same apparatus as employed in Example 1 and under the same conditions as in Example 1 except that the inner temperature of the barrel C0 was set to 80° C., and the temperatures of the barrels C2 to C7 were kept at a constant temperature of 210° C.

As a result, in the same manner as in Comparative Example 1, the existence of a lot of undecomposed urethane resin powder was visually recognized at the discharge nozzle. The evaluation in this case was X.

COMPARATIVE EXAMPLE 3

An experiment was performed using the same apparatus as employed in Example 1 and under the same conditions as in Example 1 except that the inner temperature of the barrel C0 was set to 90° C., and the temperatures of the barrels C2 to C7 were kept at a constant temperature of 230° C.

As a result, in the same manner as in Comparative Example 2, the existence of a lot of undecomposed urethane resin powder was visually recognized at the discharge nozzle. The evaluation in this case was X.

The temperatures of the barrels C0 to C7 and the preheating time in the above Example 1 and Comparative Examples 1–3 are summarized in the Table 1 shown below. Incidentally, the temperatures shown below are the temperatures of materials placed inside each of the barrels.

Herein, the temperature at the barrel C0 which is assigned for the preheating step corresponds to the preheating temperature T0, while the temperature at the barrel C3 among the barrels C1–C3 which are assigned for the kneading step corresponds to the kneading temperature T1. Further, the maximum temperature among the temperatures of barrels C4–C7 which are assigned for the decomposition step corresponds to the temperature T2.

The quantity of the consumption of the decomposer, the evaluation of the decomposed matters as well as the treatment time are summarized in Table 2 shown below. In this case, the quantity of the consumption of the decomposer, (the quantity of the consumption of decomposer at the moment when the kneading step has been accomplished)/(the quantity of decomposer charged at the kneading step), is represented by percentage. The treatment time is represented by a total time required in accomplishing the preheating step, the kneading step and the decomposition step.

TABLE 2

| No. | Decomposer consumed (%) | Decomposition | Treatment time (min) |
|---|---|---|---|
| Comparative example 1 | 50 | Δ | 20 |
| Comparative example 2 | 50 | X | 30 |
| Comparative example 3 | 50 | X | 28 |
| Example 1 | 90 | ○ | 15 |

As seen from Table 2, the treatment in Example 1 was as shown as 15 minutes, thus indicating that urethane resin could be completely treated.

EXAMPLES 2–6

Experiments were performed using the same apparatus as employed in Example 1 and under the same conditions as in Example 1 except that the temperatures of the barrels C0 to C7 were set to as shown in the following Table 3.

The temperatures of the barrels C0 to C7 and the preheating time in these Examples 2–6 are summarized in the Table 3 shown below. Incidentally, the temperatures shown below are the temperatures of materials placed inside each of the barrels.

TABLE 1

| Example No. | Temp. of barrels (° C.) | | | | | | | | T2 (° C.) | Preheating time (min) |
|---|---|---|---|---|---|---|---|---|---|---|
| | C0 | C1 | C2 | C3 | C4 | C5 | C6 | C7 | | |
| Comparative Example 1 | 190 | 190 | 190 | 190 | 190 | 190 | 190 | 190 | 190 | 1 |
| Comparative Example 2 | 80 | 190 | 210 | 210 | 210 | 210 | 210 | 190 | 210 | 4 |
| Comparative Example 3 | 90 | 190 | 230 | 230 | 230 | 230 | 230 | 190 | 230 | 3 |
| Example 1 | 190 | 190 | 194 | 198 | 202 | 208 | 210 | 190 | 210 | 1.5 |

TABLE 3

| No. | Temp. of barrels (° C.) | | | | | | | | T2 (° C.) | Preheating time (min) |
| --- | --- | --- | --- | --- | --- | --- | --- | --- | --- | --- |
| | C0 | C1 | C2 | C3 | C4 | C5 | C6 | C7 | | |
| Example 2 | 180 | 190 | 190 | 190 | 204 | 210 | 210 | 190 | 210 | 2 |
| Example 3 | 190 | 200 | 200 | 200 | 200 | 200 | 210 | 190 | 210 | 1 |
| Example 4 | 160 | 190 | 190 | 190 | 214 | 222 | 230 | 190 | 230 | 2.2 |
| Example 5 | 190 | 200 | 206 | 210 | 214 | 230 | 230 | 190 | 230 | 2 |
| Example 6 | 190 | 200 | 200 | 200 | 214 | 222 | 230 | 190 | 230 | 2.5 |

Figure 6:
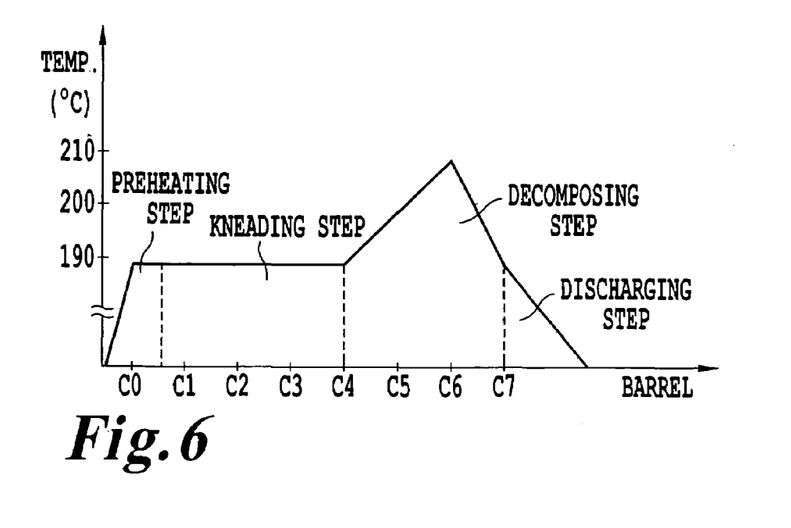
FIG. 6 is a graph illustrating the temperature history during the reaction in Example 2 of this invention.

Herein, the temperature at the barrel C0 which is assigned for the preheating step corresponds to the preheating temperature T0, while the temperature at the barrel C3 among the barrels C1–C3 which are assigned for the kneading step corresponds to the kneading temperature T1. Further, the maximum temperature among the temperatures of barrels C4–C7 which are assigned for the decomposition step corresponds to the temperature T2. Namely, these Examples 2 to 4 and 6 were the same as Example 1 except that the temperatures inside the reaction vessels in the kneading step was made constant in the region occupied by the barrels C1 to C3. The temperature history thereof is shown in the graph of FIG. 6.

The quantity of the consumption of the decomposer, the evaluation of the decomposed matters as well as the treatment time are summarized in the Table 4 shown below.

TABLE 4

| No. | Decomposer consumed (%) | Decomposition | Treatment time (min) |
| --- | --- | --- | --- |
| Example 2 | 90 | ○ | 22 |
| Example 3 | 90 | ○ | 16 |
| Example 4 | 90 | ○ | 24 |
| Example 5 | 90 | ○ | 20 |
| Example 6 | 90 | ○ | 22 |

As apparent from Table 4, it was possible in all of Examples 2 to 6 (this invention) to shorten the decomposition time, and still more, to obtain excellent decomposed matters.

EXAMPLES 7–20

As shown in the following Table 5, the decomposer and mixing ratio were changed in the decomposition tests of urethane resin. The decomposers, thermosetting resins and the mixing ratio (resin:decomposer) are summarized in the following Table 5.

TABLE 5

| No. | Decomposer | Thermosetting Resin | Resin: Decomposer |
| --- | --- | --- | --- |
| Example 7 | MEA | urethane | 5:1 |
| Example 8 | MEA | urethane | 5:1 |
| Example 9 | MEA | urethane | 5:1 |
| Example 10 | MEA | urethane | 5:1 |
| Example 11 | MEA | urethane | 10:1 |
| Example 12 | MEA | urethane | 10:1 |
| Example 13 | DEA | urethane | 5:1 |
| Example 14 | DEA | urethane | 10:1 |
| Example 15 | DEA | urethane | 10:1 |
| Example 16 | DEA | urethane | 10:1 |
| Example 17 | TEA | urethane | 5:1 |
| Example 18 | TEA | urethane | 5:1 |
| Example 19 | TEA | urethane | 10:1 |
| Example 20 | TEA | urethane | 10:1 |

The decomposers shown in Table 5 are monoethanol amine (MEA), diethanol amine (DEA), and triethanol amine (TEA). The boiling point of monoethanol amine is 171° C., while the boiling point of triethanol amine is 360° C.

The temperatures of the barrels C0 to C7 and the preheating time in these Examples 7–20 are summarized in the Table 6 shown below. Incidentally, the temperatures shown below are the temperatures of materials placed inside each of the barrels.

TABLE 6

| No. | Temp. of barrels (° C.) | | | | | | | | T2 (° C.) | Preheating time (min) |
| --- | --- | --- | --- | --- | --- | --- | --- | --- | --- | --- |
| | C0 | C1 | C2 | C3 | C4 | C5 | C6 | C7 | | |
| Example 7 | 160 | 170 | 190 | 178 | 182 | 186 | 190 | 170 | 190 | 2 |
| Example 8 | 100 | 100 | 194 | 198 | 202 | 208 | 210 | 190 | 210 | 4 |
| Example 9 | 160 | 170 | 178 | 186 | 194 | 202 | 210 | 170 | 210 | 3 |
| Example 10 | 150 | 170 | 182 | 194 | 206 | 218 | 230 | 170 | 230 | 4 |
| Example 11 | 160 | 170 | 194 | 198 | 202 | 208 | 210 | 190 | 210 | 2 |
| Example 12 | 155 | 170 | 198 | 206 | 214 | 222 | 230 | 190 | 230 | 2.5 |
| Example 13 | 170 | 170 | 178 | 186 | 194 | 202 | 210 | 170 | 210 | 2.5 |
| Example 14 | 190 | 190 | 194 | 198 | 202 | 208 | 210 | 190 | 210 | 1 |

TABLE 6-continued

| No. | Temp. of barrels (° C.) | | | | | | | | T2 (° C.) | Preheating time (min) |
| --- | --- | --- | --- | --- | --- | --- | --- | --- | --- | --- |
| | C0 | C1 | C2 | C3 | C4 | C5 | C6 | C7 | | |
| Example 15 | 190 | 190 | 198 | 206 | 214 | 222 | 230 | 190 | 230 | 1.5 |
| Example 16 | 180 | 190 | 202 | 214 | 226 | 238 | 250 | 190 | 250 | 2 |
| Example 17 | 180 | 190 | 198 | 206 | 214 | 222 | 230 | 190 | 230 | 2.5 |
| Example 18 | 185 | 190 | 202 | 214 | 226 | 238 | 250 | 190 | 250 | 2 |
| Example 19 | 190 | 210 | 214 | 218 | 222 | 226 | 230 | 210 | 230 | 1.5 |
| Example 20 | 200 | 210 | 220 | 230 | 250 | 270 | 300 | 220 | 300 | 1 |

Herein, the temperature at the barrel C0 which is assigned for the preheating step corresponds to the preheating temperature T0, while the temperature at the barrel C3 among the barrels C1–C3 which are assigned for the kneading step corresponds to the kneading temperature T1. Further, the maximum temperature among the temperatures of barrels C4–C7 which are assigned for the decomposition step corresponds to the temperature T2.

The quantity of the consumption of the decomposer, the evaluation of the decomposed matters as well as the treatment time in these Examples 7–20 are summarized in the Table 7 shown below.

TABLE 7

| No. | Decomposer consumed (%) | Decomposition | Treatment time (min) |
| --- | --- | --- | --- |
| Example 7 | 80 | ◯ | 24 |
| Example 8 | 80 | ◯ | 26 |
| Example 9 | 80 | ◯ | 22 |
| Example 10 | 85 | ◯ | 20 |
| Example 11 | 85 | ◯ | 20 |
| Example 12 | 90 | ◯ | 21 |
| Example 13 | 85 | ◯ | 21 |
| Example 14 | 90 | ◯ | 16 |
| Example 15 | 90 | ◯ | 20 |
| Example 16 | 90 | ◯ | 22 |
| Example 17 | 90 | ◯ | 16 |
| Example 18 | 90 | ◯ | 18 |
| Example 19 | 90 | ◯ | 22 |
| Example 20 | 90 | ◯ | 16 |

As apparent from Table 7, it was possible in all of Examples 7 to 20 (this invention) to shorten the decomposition time, and still more, to obtain excellent decomposed matters.

COMPARATIVE EXAMPLES 4 and 5

Experiments of decomposing urethane resin were performed under the same conditions as in Example 7 except that the temperatures of the barrels C0 to C7 were set to as shown in the following Table 8.

TABLE 8

| No. | Temp. of barrels (° C.) | | | | | | | | T2 (° C.) | Preheating time (min) |
| --- | --- | --- | --- | --- | --- | --- | --- | --- | --- | --- |
| | C0 | C1 | C2 | C3 | C4 | C5 | C6 | C7 | | |
| Comparative example 4 | 70 | 80 | 194 | 198 | 202 | 208 | 210 | 190 | 210 | 6 |
| Comparative example 5 | 190 | 190 | 194 | 198 | 202 | 208 | 210 | 190 | 210 | 0.1 |

The quantity of the consumption of the decomposer, the evaluation of the decomposed matters as well as the treatment time in Comparative Examples 4 and 5 are summarized in the Table 9 shown below.

TABLE 9

| No. | Decomposer consumed (%) | Decomposition | Treatment time (min) |
| --- | --- | --- | --- |
| Comparative example 4 | 60 | Δ | 42 |
| Comparative example 5 | 60 | Δ | 7 |

As a result, in all of Comparative Examples 4 and 5, the existence more or less of undecomposed urethane resin powder was visually recognized at the discharge nozzle. The evaluation in this case was Δ. In particular, in the case of Comparative Example 4, the existence of residual flon was also recognized in the decomposed matters.

EXAMPLES 21–26

Experiments of decomposing thermosetting resins were performed by a combination of decomposers as shown in Table 10, and of the same double-screw extruder as employed in Example 1. As for the thermosetting resins, urethane resin employed as a heat insulating member in a used refrigerator was employed. In Examples 25 and 26, ABS was also added to the urethane resin.

TABLE 10

| No. | Decomposer | Thermosetting resin | Resin:PEG: Amine |
| --- | --- | --- | --- |
| Example 21 | PEG400 + MEA | urethane | 10:10:1 |
| Example 22 | PEG400 + MEA | urethane | 10:10:1 |
| Example 23 | PEG400 + DEA | urethane | 10:10:1 |
| Example 24 | PEG400 + DEA | urethane | 10:10:1 |

TABLE 10-continued

| No. | Decomposer | Thermosetting resin | Resin:PEG: Amine |
|---|---|---|---|
| Example 25 | PEG400 + TEA | urethane + ABS | 10:10:1 |
| Example 26 | PEG400 + TEA | urethane + ABS | 10:10:1 |

PEG in Table 10 represents polyethylene glycol.

The temperatures of the barrels C0 to C7 and the preheating time in these Examples 21–26 are summarized in the Table 11 shown below. Incidentally, the temperatures shown below are the temperatures of materials placed inside each of the barrels.

TABLE 11

| No. | Temp. of barrels (° C.) | | | | | | | | T2 (° C.) | Preheating time (min) |
| | C0 | C1 | C2 | C3 | C4 | C5 | C6 | C7 | | |
|---|---|---|---|---|---|---|---|---|---|---|
| Example 21 | 170 | 170 | 190 | 178 | 182 | 186 | 190 | 170 | 190 | 3 |
| Example 22 | 170 | 170 | 178 | 186 | 194 | 202 | 210 | 170 | 210 | 1.8 |
| Example 23 | 190 | 190 | 194 | 198 | 202 | 206 | 210 | 190 | 210 | 1.5 |
| Example 24 | 180 | 190 | 198 | 206 | 214 | 222 | 230 | 190 | 230 | 1.9 |
| Example 25 | 190 | 190 | 198 | 206 | 214 | 222 | 230 | 190 | 230 | 2 |
| Example 26 | 200 | 210 | 218 | 226 | 234 | 242 | 250 | 190 | 250 | 0.8 |

Herein, the temperature at the barrel C0 which is assigned for the preheating step corresponds to the preheating temperature T0, while the temperature at the barrel C3 among the barrels C1–C3 which are assigned for the kneading step corresponds to the kneading temperature T1. Further, the maximum temperature among the temperatures of barrels C4–C7 which are assigned for the decomposition step corresponds to the temperature T2.

The quantity of the consumption of the decomposer, the evaluation of the decomposed matters as well as the treatment time in these Examples 21–26 are summarized in the Table 12 shown below.

TABLE 12

| No. | Decomposer consumed (%) | Decomposition | Treatment time (min) |
|---|---|---|---|
| Example 21 | 85 | ◯ | 35 |
| Example 22 | 90 | ◯ | 30 |
| Example 23 | 90 | ◯ | 24 |
| Example 24 | 90 | ◯ | 26 |
| Example 25 | 90 | ◯ | 22 |
| Example 26 | 90 | ◯ | 18 |

All of the decomposed matters indicated a transparent yellow viscous liquid, and existence of solid matter therein could not be observed.

EXAMPLES 27–30

Experiments of decomposing a combination of thermosetting resins, i.e., a combination of used epoxy resin, urethane and phenol resin as shown in the following Table 13, were performed by MEA as a decomposer, and of the same double-screw extruder as employed in Example 1.

TABLE 13

| No. | Decomposer | Thermosetting resin | Resin:Decomposer |
|---|---|---|---|
| Example 27 | MEA | Epoxy resin | 5:1 |
| Example 28 | MEA | Epoxy resin + Urethane resin | 5:1 |
| Example 29 | MEA | Phenol resin | 5:1 |
| Example 30 | MEA | Phenol resin + Urethane resin | 5:1 |

The temperatures of the barrels C0 to C7 and the preheating time in these Examples 27–30 are summarized in the Table 14 shown below. Incidentally, the temperatures shown below are the temperatures of materials placed inside each of the barrels.

TABLE 14

| No. | Temp. of barrels (° C.) | | | | | | | | T2 (° C.) | Preheating time (min) |
| | C0 | C1 | C2 | C3 | C4 | C5 | C6 | C7 | | |
|---|---|---|---|---|---|---|---|---|---|---|
| Example 27 | 170 | 170 | 180 | 190 | 210 | 230 | 230 | 170 | 230 | 3 |
| Example 28 | 160 | 170 | 180 | 190 | 220 | 230 | 230 | 170 | 230 | 2 |
| Example 29 | 165 | 170 | 180 | 210 | 230 | 240 | 240 | 170 | 240 | 2 |
| Example 30 | 160 | 170 | 190 | 210 | 230 | 230 | 230 | 170 | 230 | 2 |

Herein, the temperature at the barrel C0 which is assigned for the preheating step corresponds to the preheating temperature T0, while the temperature at the barrel C3 among the barrels C1–C3 which are assigned for the kneading step corresponds to the kneading temperature T1. Further, the maximum temperature among the temperatures of barrels C4–C7 which are assigned for the decomposition step corresponds to the temperature T2.

The quantity of the consumption of the decomposer, the evaluation of the decomposed matters as well as the treatment time in these Examples 27–30 are summarized in the Table 15 shown below.

TABLE 15

| No. | Decomposer consumed (%) | Decomposition | Treatment time (min) |
|---|---|---|---|
| Example 27 | 90 | ○ | 24 |
| Example 28 | 85 | ○ | 28 |
| Example 29 | 90 | ○ | 26 |
| Example 30 | 90 | ○ | 22 |

All of the decomposed matters indicated a transparent slightly deep yellowish viscous liquid, and existence of solid matter therein could not be observed.

Regeneration of Decomposed Matters:

EXAMPLE 31

First of all, 100 g of decomposed matters obtained in Example 2 were mixed under stirring with 50 g of polyol to obtain a mixture, to which 80 g of MDI was further added to prepare a mixed solution.

This mixed solution was poured in a mold and left to stand for one day at room temperature. As a result, it was possible to obtain a foamed and cured resin composition. The density of this resin composition was 180 kg/m$^3$, and foamed urethane thus produced showed a foam magnification of about 5 times.

EXAMPLE 32

40 g of decomposed matters obtained in Example 2 were kept at a temperature of 60° C., and then, mixed with 10 g of epoxy resin (Epicoat 4100E, Asahi Denka Co., Ltd.), the resultant mixture being subsequently stirred.

The mixed solution thus obtained was poured in a mold and degassed in vacuum, after which the resultant mixed solution was left to stand overnight in an oven which was kept at a temperature of 120° C. As a result, it was possible to obtain a rubber-like molded resin.

EXAMPLE 33

40 g of decomposed matters obtained in Example 2 were kept at a temperature of 60° C., and then, mixed with 10 g of epoxy resin (Epicoat 4100E, Asahi Denka Co., Ltd.), the resultant mixture being subsequently stirred.

The mixed solution thus obtained was poured in a mold and degassed in vacuum, after which the resultant mixed solution was left to stand overnight in an oven which was kept at a temperature of 120° C. As a result, it was possible to obtain a rubber-like molded resin.

COMPARATIVE EXAMPLE 6

40 g of decomposed matters obtained in Comparative Example 2 were kept at a temperature of 60° C., and then, mixed with 20 g of epoxy resin (Epicoat 4100E, Asahi Denka Co., Ltd.), the resultant mixture being subsequently stirred.

The mixed solution thus obtained was poured in a mold and degassed in vacuum, after which the resultant mixed solution was left to stand overnight in an oven which was kept at a temperature of 120° C. As a result, the mixed solution failed to cure, retaining its original liquid state. Even if the temperature was raised up to 150° C., curing of the mixed solution could not be observed.

As explained above, according to this invention, it is now possible to provide a method as well as an apparatus for decomposing thermosetting resins, which make it possible to shorten the time required to decompose thermosetting resins. Further, it is also possible according to this invention to provide a temperature control program for reliably decomposing thermosetting resins within a short period of time.

Therefore, this invention can be effectively utilized in the decomposition of thermosetting resins, in particular, in the decomposition of urethane resins included in the wastes of discarded electric household appliances, and hence this invention would be very valuable from an industrial viewpoint.

The disclosure of Japan application No. P2000-296354, filed Sep. 28, 2000, of which foreign priority is claimed, is hereby incorporated by reference.

The invention claimed is:

1. A method of decomposing a thermosetting resin by a decomposer, comprising the steps of:

pre-heating the thermosetting resin up to a preheating temperature T0;

kneading the pre-heated thermosetting resin together with a decomposer, and concurrently heating a mixture comprising the thermosetting resin and the decomposer up to a kneading temperature T1, thereby allowing a reaction to take place between the decomposer and the thermosetting resin to obtain a kneaded matter wherein the decomposer becomes consumed; and heating said kneaded matter to a maximum temperature T2 to decompose the thermosetting resin; wherein:

said pre-heating temperature T0 is not higher than the boiling temperature of said decomposer;

said kneading temperature T1 is not lower than said pre-heating temperature T0 but is lower than the thermal decomposition temperature of the thermosetting resin;

said maximum temperature T2 is lower than the thermal decomposition temperature of the thermo setting resin; and said pre-heating of the thermosetting resin is performed under the following conditions of temperature T0 and time t:

100° C. ≦ T0 < 260° C.

0.5 min ≦ t ≦ 7 min, and wherein when said thermosetting resin is a urethane resin, urethane moieties thereof are decomposed.

2. The method according to claim 1, wherein said preheating step is performed under the following conditions of temperature T0 and time t:

$100°\text{C.} \leq T0 \leq 230°\text{C.}$ $3.375 \leq 0.0125 T0 + t \leq 8.25.$ 3. The method according to claim 1, wherein said kneading step of thermosetting resins and decomposers is continued, while monitoring the quantity of residual decomposer, until the quantity of residual decomposer is reduced to less than 10%.

4. The method according to claim 1, wherein the thermosetting resin and the decomposer are present in the mixture in a ratio of thermosetting resin: decomposer of 2:3 to 1:20, based on weight.

5. The method according to claim 4, wherein ratio is 1:5 to 1:7, based on weight.

6. The method according to claim 1, wherein a temperature during said kneading step is maintained substantially constant, and the final temperature T1 thereof is substantially identical with the preheating temperature T0.

7. The method according to claim 1, wherein the final temperature T1 in said kneading step is higher than the preheating temperature T0.

8. The method according to claim 1, wherein said decomposer is enabled to react with and attach to said thermosetting resin during the kneading step, thereby producing an intermediate product.

9. The method according to claim 8, wherein the boiling point of said intermediate product to be produced during the kneading step is higher than the boiling point of said decomposer.

10. The method according to claim 8, wherein said thermosetting resin comprises a resin having a carbonyl group.

11. The method according to claim 10, wherein said resin having a carbonyl group is selected from the group consisting of urethane resin, urea resin and unsaturated polyester, and said intermediate product is produced through attaching of said decomposer to a carbon atom of said carbonyl group.

12. The method according to claim 11, wherein said decomposer comprises an amine compound, and said intermediate product is produced through attaching of a nitrogen atom of said amine compound to a carbon atom of said carbonyl group.

13. The method according to claim 12, wherein said amine compound is an alkanol amine.

14. The method according to claim 13, wherein said alkanol amine is monoethanol amine.

15. The method according to claim 13, wherein said alkanol amine is diethanol amine.

16. The method according to claim 13, wherein said alkanol amine is triethanol amine.

17. The method according to claim 11, wherein said decomposer comprises a compound having a hydroxyl group, and said intermediate product is produced through attaching of an oxygen atom of said hydroxyl group to a carbon atom of said carbonyl group.

* * * * *